US007092713B2

(12) United States Patent
Raji

(10) Patent No.: US 7,092,713 B2
(45) Date of Patent: Aug. 15, 2006

(54) ESTABLISHING CALL PATHS BETWEEN SOURCE WIRELESS COMPUTING SYSTEMS AND REMOTE WIRELESS COMPUTING SYSTEMS USING INTERMEDIARY COMPUTING SYSTEMS

(75) Inventor: Vijaye G. Raji, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 448 days.

(21) Appl. No.: 10/426,088

(22) Filed: Apr. 29, 2003

(65) Prior Publication Data

US 2004/0219878 A1 Nov. 4, 2004

(51) Int. Cl.
*H04Q 7/20* (2006.01)

(52) U.S. Cl. ............. 455/445; 455/11.1; 455/16; 455/41.2; 370/338

(58) Field of Classification Search .......... 455/11.1, 455/445, 16, 41.2; 370/338
See application file for complete search history.

(56) References Cited

U.S. PATENT DOCUMENTS

| 6,044,062 | A  | * | 3/2000  | Brownrigg et al. ....... 370/238 |
| 6,055,429 | A  | * | 4/2000  | Lynch ..................... 455/445 |
| 6,304,745 | B1 | * | 10/2001 | Monch ..................... 455/13.1 |
| 6,785,513 | B1 | * | 8/2004  | Sivaprakasam ........... 455/63.1 |
| 6,795,688 | B1 | * | 9/2004  | Plasson et al. ............ 455/41.2 |
| 2001/0012776 | A1 | * | 8/2001 | Chandler et al. .......... 455/435 |

* cited by examiner

*Primary Examiner*—Nick Corsaro
*Assistant Examiner*—Alejandro Rivero
(74) *Attorney, Agent, or Firm*—Workman Nydegger

(57) ABSTRACT

A mechanism that allows one wireless computing system to communicate with another even though they are out of range of each other's transmitter/receiver circuitry, and without requiring dedicated external equipment to facilitate the communication. Instead, intermediary wireless computing systems may facilitate the communication. Upon receiving a request to communicate with a destination wireless device, each intermediary computing system discovers available wireless communications, and forwards the communication to them. The next intermediary computing system does the same, and so on and so forth, until the destination wireless device receives the wireless communication. The response is returned via the same path in reverse. Accordingly, the source wireless computing system may discover a possible wireless path to the destination wireless device. Possible wireless paths may be added and deleted as those wireless paths are created and destroyed, respectively, due to the mobility of the wireless computing systems.

25 Claims, 5 Drawing Sheets

ESTABLISHING CALL PATHS BETWEEN SOURCE WIRELESS COMPUTING SYSTEMS AND REMOTE WIRELESS COMPUTING SYSTEMS USING INTERMEDIARY COMPUTING SYSTEMS

BACKGROUND OF THE INVENTION

1. The Field of the Invention

The present invention relates to wireless networking technology. More specifically, the present invention relates to mechanisms for supporting dynamic wireless networks in which two wireless devices may communicate using one or more other wireless devices as an intermediary from one wireless network to the next.

2. Background and Related Art

Computers now come in a wide variety of forms including desktop computers, laptop computers, tablet PCs, Personal Digital Assistants (PDAs), telephones, and even smaller devices. Such devices may have the ability to communicate over a wireless network. In this specification and claims, a "wireless device" is any device that is capable of communicating over one or more wireless networks even if that device is also capable of communicating over a wired network.

The ability to communicate over a wireless network has become a popular attribute of computers. Accordingly, wireless devices are now spread throughout the globe. The ability to connect to a wireless network is particularly useful for portable computing devices as wireless networks typically allow the portable computing devices to be moved greater distances and with less restriction that it would if physically connected to a wired network.

In many cases, one wireless device communicates directly with another wireless device by transmitting and receiving information over the air. This method of communicating is quite convenient as no additional hardware is needed to facilitate communication other than wireless communication circuitry and/or software running on each wireless device. However, if one wireless device were to leave the range of the other wireless device, then communication between the two wireless devices would cease unless there was additional hardware external to the wireless devices that provide the missing link between the two wireless devices.

Accordingly, absent external networking hardware, wireless communication between two wireless devices depends on the two devices being within range of each other's transmitter/receiver circuitry. It would be advantageous to allow two wireless devices to wirelessly communicate one with another even if the two wireless devices are out of each other's range, and without requiring additional dedicated external hardware.

BRIEF SUMMARY OF THE INVENTION

The foregoing problems with the prior state of the art are overcome by the principles of the present invention which are directed towards mechanisms for achieving wireless communication between two wireless computing systems over a number or wireless networks using one or more intermediary wireless computing systems. The wireless communication may be accomplished despite the two communicating wireless computing systems being out of each other's immediate range.

The wireless computing system (hereinafter also called the source wireless computing system) that is to communicate with the other wireless computing system (hereinafter also called the remote wireless computing system) discovers one or more possible wireless paths that enable communication with the remote wireless computing system. The destination need not be the remote wireless computing system itself, but may instead be another computing system that the remote wireless computing system may communicate with. The source wireless computing system may accomplish this by first identifying all wireless computing systems within its immediate range. Then, the source wireless computing system transmits a wireless communication to at least some of these identified proximate wireless computing systems, the wireless communication specifying the destination computing system.

Each proximate wireless computing system may then perform the following. Specifically, the proximate wireless computing system determines that it is not the intended destination of the wireless communication. The proximate wireless computing system then identifies the next wireless computing system in the wireless path, and then transmits the wireless communication to that next wireless computing system. The next wireless computing system may then perform the acts attributed herein to the proximate computing system until finally the wireless communication arrives at the remote wireless computing system. If the remote wireless computing system was not the destination of the wireless communication, the remote wireless computing system communicates the content of the wireless communication to the ultimate destination.

A response is then returned from the destination computing system over the same path. The response will identify the routing path between the proximate wireless computing system and the destination computing system. The proximate wireless computing system receives this response and identifies the wireless path between the source and remote wireless computing systems. The proximate wireless computing system then notes this wireless path and may report the same to the source wireless computing system. Additionally, the proximate wireless computing system may do this same method via alternative wireless paths, and potentially report the alternative wireless routes as well.

The source wireless computing system may receive such a response from each of the proximate wireless computing systems, each proximate wireless computing system potentially reporting regarding multiple possible wireless paths. The source wireless computing system then determines which is the best wireless path to use when communicating with the wireless device. The proximate wireless computing system may also perform the task of identifying the best wireless path to use and use that best wireless path when receiving any wireless communication to the remote wireless computing system.

The next time the source wireless computing system is to communicate with the destination computing system, the source wireless computing system may specify the best wireless path. If a link in that best wireless path is broken, the next best wireless path may be used and so on and so forth until there are no wireless paths left to choose from. In that case, the above-described method for discovering new wireless paths may be reinitiated. Should an intermediary wireless computing system in a particular wireless path become aware that a link in the wireless path has been broken, that intermediary wireless computing system may notify the previous wireless computing system of this fact. That previous wireless computing system may notify its previous wireless computing system, and so on and so forth, until the source wireless computing system is finally notified of the lack of availability of that wireless path. Accordingly, the method takes into consideration the dynamic nature of the creation and destruction of possible wireless paths that is likely considering the portable nature of many wireless computing systems.

Should the proximate computing system subsequently receive a wireless communication destined for the destination computing system or to another of the intermediary computing systems in the identified path (whether originating from the source wireless computing system or not), the noted wireless path or paths may be used to route the wireless communication.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to a mechanism that allows one wireless computing system to communicate with another even though they are out of range of each other's transmitter/receiver circuitry, and without requiring dedicated external equipment to facilitate the communication. Instead, intermediary wireless computing systems may facilitate the communication in the background, without the users of the intermediary wireless computing system necessarily being aware that their wireless computing system is facilitating the wireless communication even though they had previously granted general permission for their wireless computing system to facilitate such wireless communications.

The embodiments of the present invention may include a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Figure 1:
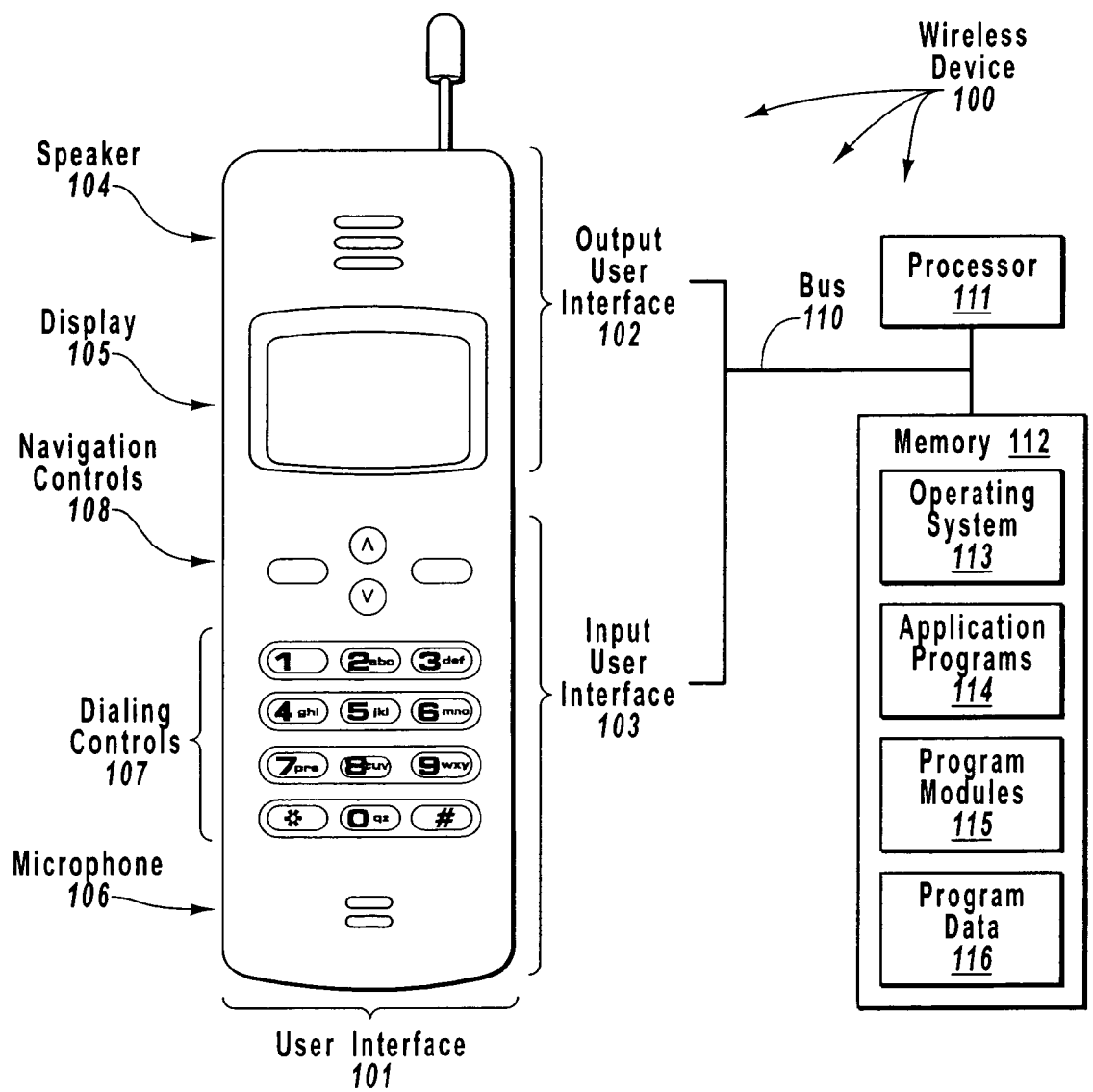
FIG. 1 illustrates a suitable wireless computing system in which the principles of the present invention may operate.

FIG. 1 and the following discussion are intended to provide a brief, general description of a suitable computing environment in which the invention may be implemented. Although not required, the invention will be described in the general context of computer-executable instructions, such as program modules, being executed by computing devices. Generally, program modules include routines, programs, objects, components, data structures, and the like that perform particular tasks or implement particular abstract data types.

With reference to FIG. 1, a suitable operating environment for the principles of the invention includes a general purpose computing device in the form of a wireless device 100. For clarity, elements are labeled with their most significant digit being the same as the figure number in which they are presented. For example, all elements in FIG. 1 have element numbers in the 100's, all elements in FIG. 2 have element numbers in the 200's, and so forth. Accordingly, the figure in which an element is shown may be easily derived from its element number.

Although the wireless device 100 has the appearance of a telephone, a wide-variety of devices are now capable of communicating over a wireless network and may benefit by employing the principles of the present invention. For example, laptop computers, tablet PCs, Personal Digital Assistants (PDAs), and other wireless devices are now available. Other wireless device forms may be developed in the future. The principles of the present invention are not limited to the particular form of the wireless device.

The wireless device 100 includes a user interface 101 for allowing a user to input information through an input user interface 103. The user reviews information presented via an output user interface 102. The user interface will vary widely depending on the form factor of the wireless device.

In the illustrated embodiment, however, in which the wireless device 100 is a telephone, the output user interface 102 includes a speaker 104 for presenting audio information to the user, as well as a display 105 for presenting visual information to the user.

The input user interface 103 may include a microphone 106 for rendering audio information into electronic form. In addition, the input user interface 103 includes text input in the form of dialing controls 107 and navigation controls 108 that allow the user to input navigate through information presented on the display 105.

Program code means comprising one or more program modules may be stored in a memory 112. The one of more program modules may include an operating system 113, one or more application programs 114, other program modules 115, and program data 116. The one or more program modules may be instantiated in the memory (if volatile), or loaded from memory (if non-volatile) and then further processed using a processor 111. The memory 112 may include non-volatile as well as volatile memory and its form may vary greatly depending on the type of wireless device. A bus 110 facilitates communication between each of the physical components of the wireless device 100.

While FIG. 1 represents a suitable operating environment for the present invention, the principles of the present invention may be employed by any wireless computing system that is capable of communicating over a wireless network. The wireless device illustrated in FIG. 1 is illustrative only, and by no means represents even a small portion of the wide variety of environments in which the principles of the present invention may be implemented. Indeed, wireless computing systems (which include wireless devices) are known for their wide diversity of forms, any of which may implement the features of the present invention with suitable software and/or hardware.

Wireless computing systems such as the one described above with respect to FIG. 1 have gained in popularity and now are spread throughout the globe. In many environments, it is highly likely that any given wireless computing system may be within the immediate range of one, several, or many other wireless computing systems. Conventional wireless networking standards currently allow wireless computing systems to detect when other wireless computing systems are within its range. If properly configured, such wireless devices may also identify each other, and communicate with each other. Once the wireless devices are out of each other's immediate range, wireless communication conventionally is no longer available unless there are further external dedicated systems available to extend wireless communication.

In accordance with the principles of the present invention, mobile communication devices such as cell phones, PDA's, laptop computers, and other wireless devices are not just devices that help their users communicate. Instead and with their user's permission, such mobile communication devices are turned into a relay wireless computing system that facilitates communication between two wireless computer systems that are out of each other's immediately range, but are within the range of the relay wireless computing system. Even many intermediary relay wireless computing systems may facilitate communication between two wireless computing systems. In essence, the moving pool of mobile devices spread throughout the globe may become a dynamically flowing and constantly changing mobile network by implementing the features of the present invention. Accordingly, the features of the present invention introduce a new paradigm into the world of wireless networking.

Figure 2:
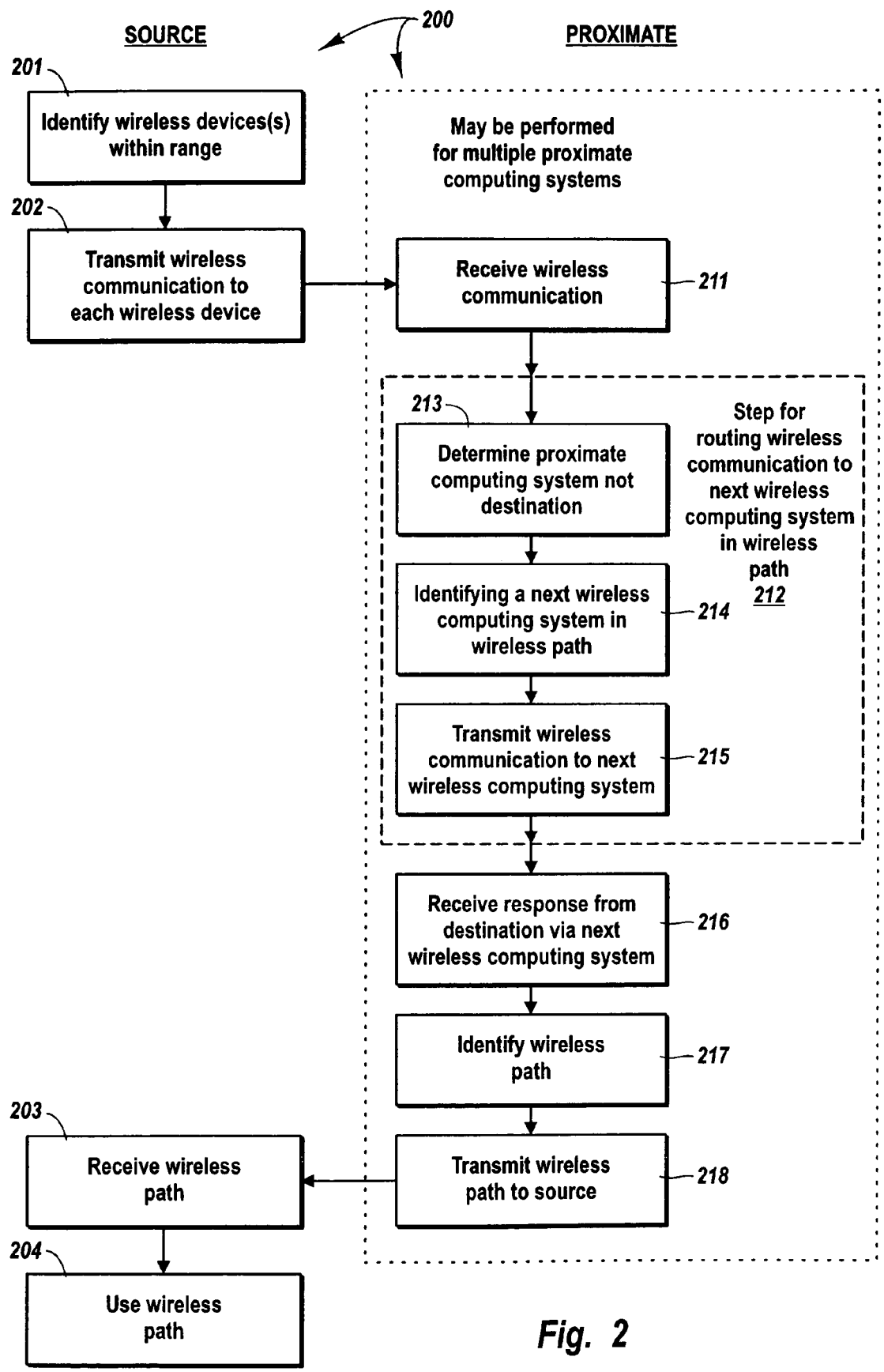
FIG. 2 illustrates a method for one wireless computing system communicating with another wireless computing system even though they are out of range in accordance with the principles of the present invention.

FIG. 2 illustrates a flowchart of a method 200 for one computing system (hereinafter referred to as a source wireless computing system) to communicate with another wireless computing system (hereinafter referred to a remote wireless computing system), or to a computing system communicatively coupled to the remote wireless computing system, despite the two wireless computing systems being out of range, and even if there is no dedicated networking systems intervening between the wireless computing systems. Instead, there are mobile intermediary wireless devices intervening between the two end wireless computing systems to facilitate wireless communication. In one embodiment, the wireless communication may be a packet-based communication although that need not be the case.

The source and remote wireless computing systems may both be, for example, mobile wireless devices that are communicating with other. In that case, the source wireless computing system would communicate with the remote wireless computing system being the ultimate destination. Alternatively, the remote wireless computing system may be, for example, a wireless access point, in which case, the source wireless computing system may communicate over the one of more wireless computing systems to the remote wireless access point, in order to facilitate ultimate communication to some computing system on the Internet.

The intermediary wireless computing system that represents the closest link to the source wireless computing system will often be referred to herein as the "proximate" wireless computing system. The source, intermediary and remote wireless computing systems may have the structure described above with respect to the wireless device 100, although that is by no means required.

FIGS. 3 through 6 illustrate several wireless network configurations in which a source wireless computing system communicates with a remote wireless computing system or to a computing system communicatively coupled to the remote wireless computing system. In each case, the source wireless computing system communicates via a series of one or more intermediary wireless computing systems including the proximate wireless computing system. The intermediary wireless devices may include, for example, fixed computing systems or devices. However, at least one (and potentially all) of the intermediary wireless computing systems is mobile.

Figure 3:
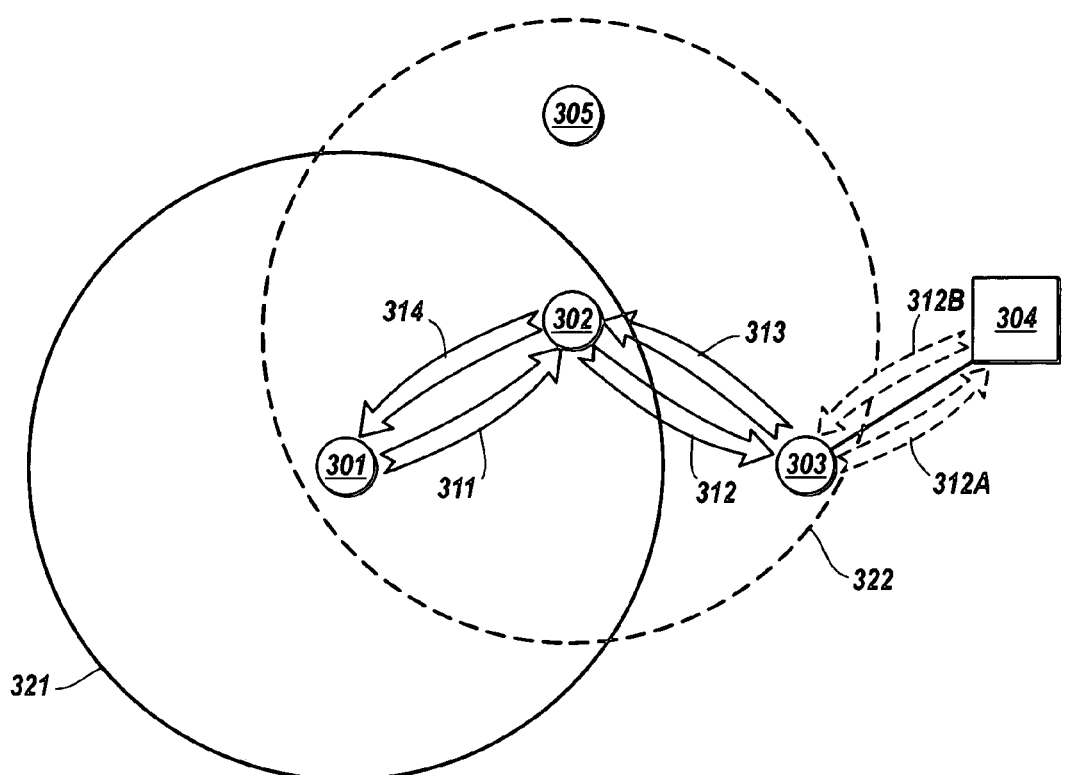
FIG. 3 illustrates a wireless network environment in which one wireless computing system communicates with another wireless computing system via a single wireless computing system as an intermediary.

For example, FIG. 3 illustrates a source wireless computing system 301 communicating with a remote wireless computing system 303 (or to the computing system 304 communicatively coupled to the remote wireless computing system 303) via proximate wireless computing system 302.

Figure 4:
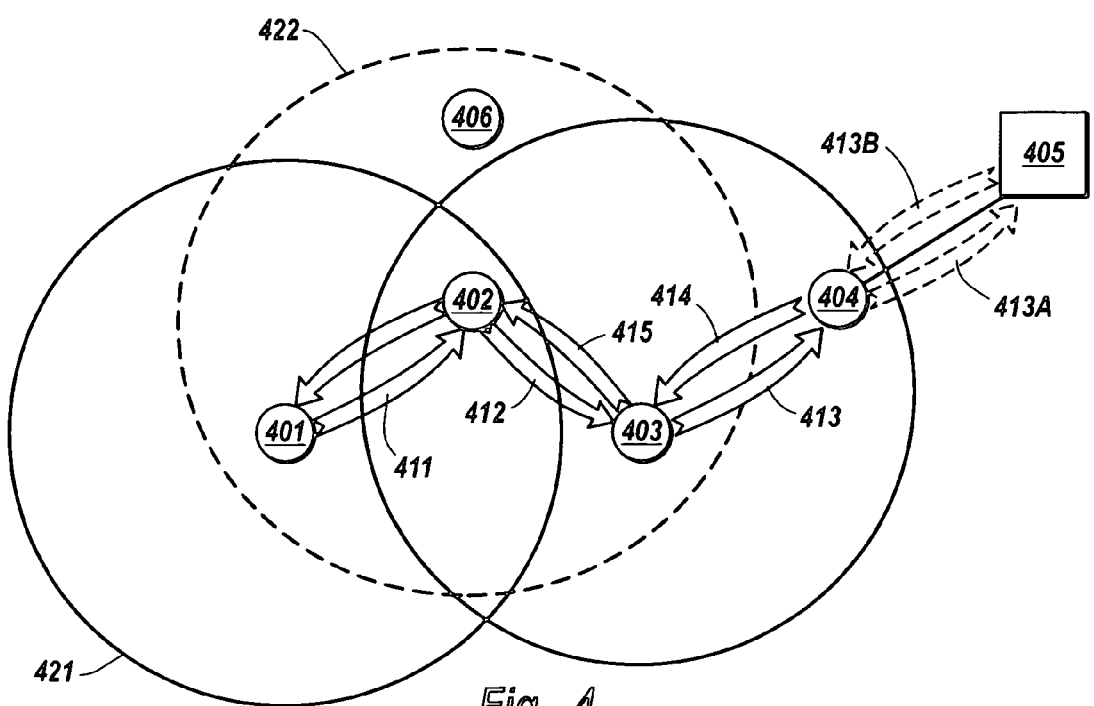
FIG. 4 illustrates a wireless network environment in which one wireless computing system communicates with another wireless computing system via multiple wireless computing systems as intermediaries.

FIG. 4 illustrates a source wireless computing system 401 communicating with a remote wireless computing system 404 (or to the computing system 405 communicatively coupled to the remote wireless computing system 404) via proximate wireless computing system 402.

Figure 5:
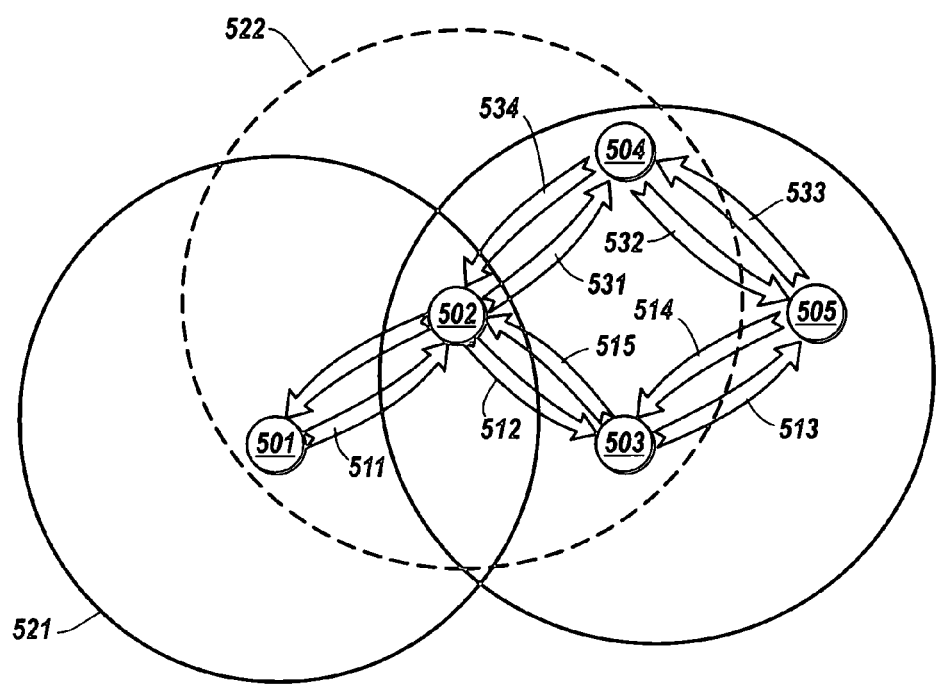
FIG. 5 illustrates a wireless network environment in which a proximate wireless computing system identifies multiple wireless paths that are available for one wireless computing system to communicate with another wireless computing system.

FIG. 5 illustrates a source wireless computing system 501 communicating with a remote wireless computing system 505 via proximate wireless computing system 502. For clarity, the optional computing system communicatively coupled to the remote wireless computing system 505 is not shown in FIG. 5.

Figure 6:
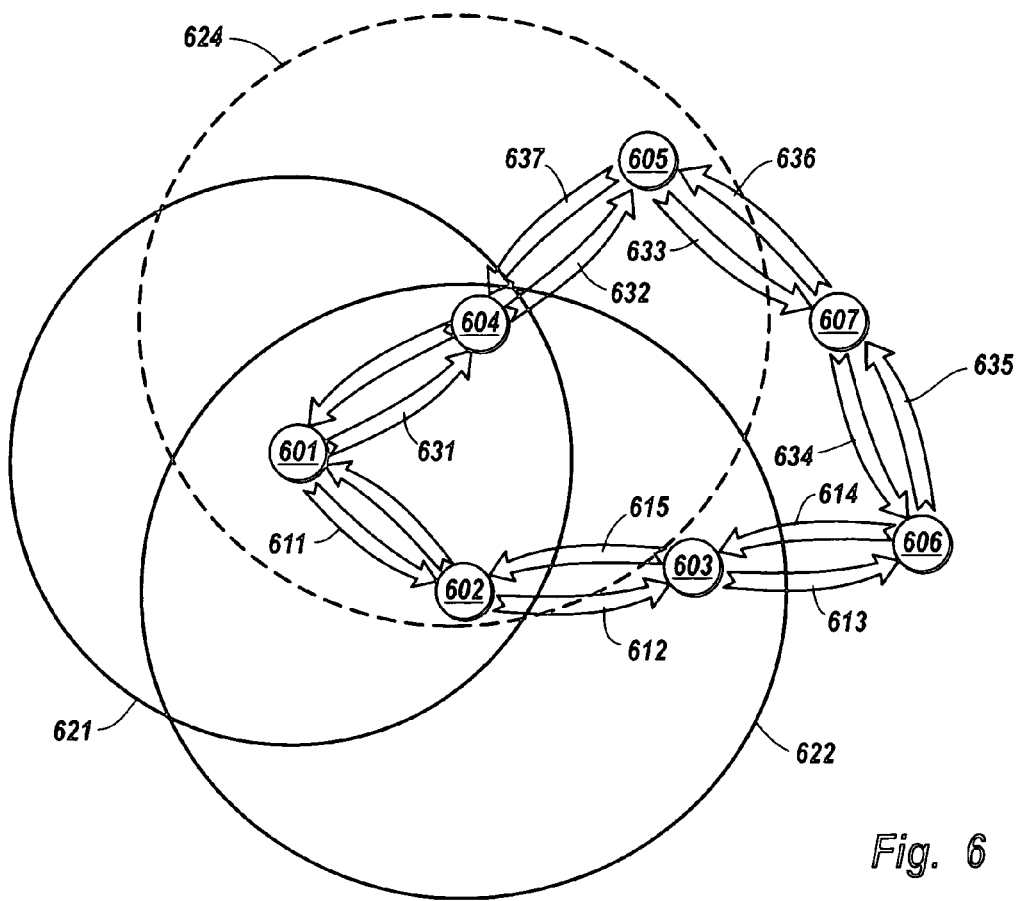
FIG. 6 illustrates a wireless network environment in which a proximate wireless computing system identifies multiple wireless paths that are available for one wireless computing system to communicate with another wireless computing system.

FIG. 6 illustrates a source wireless computing system 601 communicating with a remote wireless computing system 606 via two proximate wireless computing systems 602 and 604. Once again, for clarity, the optional computing system communicatively coupled to the remote wireless computing system 606 is not shown in FIG. 6.

Some of the acts of the method 200 are performed by the source wireless computing system as represented in the left column of FIG. 2 under the heading "SOURCE". A step and other acts of the method 200 are performed by the proximate wireless computing system as represented in the right column of FIG. 2 under the heading "PROXIMATE". The method 200 of FIG. 2 may be performed in each of the wireless network environments illustrated in FIGS. 3 through 6. Accordingly, the method 200 of FIG. 2 will be described with frequent reference to FIGS. 3 through 6.

The source wireless computing system identifies a plurality of wireless devices within range of the source wireless computing system (act 201). The range of the source wireless computing systems 301, 401, 501 and 601 are represented in respective FIGS. 3, 4, 5 and 6 by circles 321, 421, 521 and 621. The range of the various wireless computing systems and devices are illustrated in the various figures as being circles or ovals with the associated wireless computing system or device at its approximate center. However, those of ordinary skill in the art will recognize that the shape of the range of a wireless computing system or device depends heavily on the type of antenna(s) being used, and on the nature of obstacles within or defining the range.

The wireless device(s) within range of the source computing system 301 includes proximate computing system 302. The wireless device(s) within range of the source computing system 401 includes proximate computing system 402. The wireless device(s) within range of the source computing system 501 includes proximate computing system 502. The wireless device(s) within range of the source computing system 601 include proximate computing systems 602 and 604. Methods for a wireless computing system to detect the presence of other wireless devices within its range are known to those of ordinary skill in the art. Some wireless communication standards such as IEEE 802.11b expressly provide for this ability.

Then, the source wireless computing system transmits a wireless communication to each of at least some of the plurality of surrounding wireless devices (act 202). For example, the source wireless computing system 301 transmits the wireless communication to proximate wireless computing system 302 as represented by arrow 311. Similarly, the source wireless computing system 401 transmits the wireless communication to proximate wireless computing system 402 as represented by arrow 411. The source wireless computing system 501 transmits the wireless communication to proximate wireless computing system 502 as represented by arrow 511. The source wireless computing system 601 transmits the wireless communication to proximate wireless computing system 602 as represented by arrow 611, and to proximate wireless computing system 604 as represented by arrow 631.

The wireless communication specifies either the remote wireless computing system or a computing system communicatively coupled to the wireless device as the destination of the wireless communication. For example, the wireless communication in FIG. 3 may have destination address information corresponding to the remote wireless computing system 303 or to computing system 304 being communicatively coupled to the remote wireless computing system 303. The wireless communication in FIG. 4 may have destination address information corresponding to the remote wireless computing system 404 or the computing system 405 communicatively coupled to the remote wireless computing system 404. The wireless communication in FIG. 5 may have destination address information corresponding to the remote wireless computing system 505 or to a computing system (not shown) communicatively coupled to the remote wireless computing system 505. The wireless communication in FIG. 6 may have destination address information corresponding to the remote wireless computing system 606 or to a computing system (not shown) communicatively coupled to the remote wireless computing system 606.

Each proximate wireless computing system may perform the step and acts included under the header PROXIMATE in FIG. 2. For example, in the environment of FIG. 6, proximate wireless computing systems 602 and 604 may both perform the step and acts included under the header PROXIMATE in FIG. 2.

For example, each proximate wireless computing system that was sent the wireless communication (and that is within range of the source wireless computing system that sent the wireless communication) receives the wireless communication (act 211) For example, proximate wireless computing systems 302, 402, 502, 602 and 604 having respective ranges 322, 422, 522, 622 and 624 receive the wireless communication from corresponding source wireless computing systems 301, 401, 501, 601 and 601, respectively.

The proximate computing system then performs a functional, result-oriented step for routing the wireless communication to the next wireless computing system in the wireless path (step 212). This step may include any corresponding acts for accomplishing the stated result. However, in the illustrated embodiment of FIG. 2, the step 212 includes corresponding acts 213, 214 and 215.

Specifically, the proximate wireless computing system determines that it is not the destination of the wireless communication (act 213). This may be accomplished by evaluating the destination address of the wireless communication and comparing that address to the address of the proximate wireless computing system.

Next, the proximate wireless computing system identifies a next wireless computing system in the wireless path (act 214). At this stage, the proximate wireless computing system has not necessarily identified that the next wireless computing system is indeed the next wireless computing system in the wireless path. The proximate wireless computing system has merely identified the presence of another possible wireless computing system with which it may communicate. It just happens that that wireless computing system is the next wireless computing system in the yet-to-be identified wireless path. As the ultimate wireless path has not yet been identified at this stage, the proximate wireless device may also identify other wireless devices with which it can communicate, even though those wireless devices cannot ultimately be used to establish an uninterrupted chain of intermediary wireless devices to the remote wireless device. Such wireless devices will also be referred to herein as "dead end" wireless devices.

In FIG. 3, the proximate wireless computing system 302 identifies wireless devices 303 and 305 as being within its range. At this stage, the proximate wireless computing system 302 may positively identify a wireless route between the source wireless computing system and the remote wireless computing system 303. Specifically, that wireless route is from the source wireless computing system 301 to the proximate wireless computing system 302 as represented by the arrow 311, and to the remote wireless computing system 303 as represented by arrow 312. A return path would be from the remote wireless computing system 303 to the proximate wireless computing system 302 as represented by arrow 313, and to the source wireless computing system as represented by the arrow 314.

If the ultimate destination of the wireless communication in FIG. 3 was indeed the remote wireless computing system 303, then the proximate computing system 302 may also determine the entire path between the source wireless computing system and the (destination of the wireless communication. At that stage, the proximate wireless computing system 302 may simply deliver the wireless communication to the remote wireless computing system to complete the transfer (act 215). In addition, the proximate wireless computing system 302 may inform the source wireless computing system of the full wireless path.

If the ultimate destination of the wireless communication in FIG. 3 was not the remote wireless computing system 303, but was the computing system 304 communicatively coupled to the remote wireless computing system 303, the proximate wireless computing system 302 does not yet have knowledge of the full path between the source wireless computing system 301 and the destination computing system 304. Furthermore, if there are two or more intermediary wireless computing systems between the source and remote wireless computing systems (as in FIGS. 4, 5 and 6), then the proximate wireless computing system would not be able to identify the wireless path merely by identifying wireless devices within its range, since none of those wireless devices would actually be the remote wireless computing system. Accordingly, the proximate wireless computing system would take further action to complete the transfer of the wireless communication and the identification of the wireless path.

Specifically, the proximate wireless computing system would identify at least one wireless computing system that is within range of the proximate wireless computing system, at least one of those in-range wireless computing systems being the next wireless computing system in the yet-to-be-identified wireless path (act 214). The proximate wireless computing system then transmits the wireless communication to one or more of the at least one wireless computing systems including the next wireless computing system in the yet-to-be-identified wireless path (act 215).

At this stage, the wireless communication need not be the same as the original wireless communication received from the source wireless communication. Instead, the wireless communication may be a mere discovery message designed to discover the wireless path, but not convey the data represented in the original wireless communication. Any data desired to be transferred may be transmitted after the wireless path is discovered. However, depending on the bandwidth of the wireless networks, it may be desirable to communicate the wireless communication with all the substantive data that is to be communicated.

For example, the proximate wireless computing system 302 may transfer the wireless communication (or a derivative or discovery message), to the remote wireless computing system 303 and also separately to the wireless computing system 305. The remote wireless computing system 303 just happens to be the next wireless computing system in the wireless path, while the wireless computing system 305 is a mere dead end wireless computing system. However, at this stage, the proximate wireless computing system 302 may not have a mechanism for deciding which of the wireless computing systems 303 and 305 is more likely to be the next wireless computing system in the wireless path. The remote wireless computing system 303 may then determine that the computing system 304 with which it may communicate is the destination of the wireless communication, and thus sends the communication to the computing system 304 as represented by arrow 312A.

Note that although the source wireless computing system 301 is also within range of the proximate wireless computing system 302, each of the intermediary computing systems may be configured to abstain from sending the wireless communication back to a wireless computing system through which the wireless communication already passed or back to the source wireless computing system. This ensures that any discovered path has no unneeded loops, and also reduces the communication, network bandwidth, and processing needed to discover the path.

In this case, where the proximate wireless computing system 302 does not have a mechanism for discovering the next wireless computing system, the proximate computing system 302 may simply broadcast the wireless communication to all wireless devices within its range except for wireless devices that have already received the wireless communication as evidenced by the wireless communication itself. The wireless devices that received the broadcasted wireless computing system may then repeat the broadcasting process, and so on, until the remote wireless computing system eventually receives the wireless communication. Other copies of the wireless communication that were broadcasted along other paths may be dropped once they hit a dead end. Alternatively, the other wireless communication may arrive at the remote wireless device using alternate paths. The remote wireless device may respond to each of these received wireless communications, thereby informing the proximate computing system of a number of possible paths. Instead of the proximate wireless computing system initiating the broadcast process, the source wireless device may have initiated the broadcast process.

In the case of FIG. 4, the proximate wireless computing system 402 identifies wireless computing systems 403 and 406 as being within range and may send the wireless communication or a derivative thereof to the next wireless computing system 403 as represented by arrow 412, as well as to the dead end wireless computing system 406. The next wireless computing system 403 may repeat the same process as described above for the proximate wireless computing system until the wireless communication is sent from the wireless computing system 403 to the remote wireless computing system 404 as represented by arrow 413. The remote wireless computing system 404 may then potentially send the communication to computing system 405 as represented by the arrow 413A.

The wireless computing system 406 may also perform the same procedure unless it already knows that it is a dead end with respect to the communication. Ultimate, any wireless communications that go through the dead end wireless computing system 406 will be dropped with the final wireless computing system finally determining that there are no other wireless computing system to send the wireless communication to that have not already served as a wireless node for the wireless communication.

In the case of FIG. 5, the proximate wireless computing system 502 identifies wireless computing systems 503 and 504 as being within range. The proximate wireless computing system 502 sends the wireless communication to the wireless computing system 503 as represented by arrow 512, and to the wireless computing system 504 as represented by arrow 531. The wireless computing system 503 may repeat the same process as described above for the proximate wireless computing system until the wireless communication is sent from the wireless computing system 503 to the remote wireless computing system 505 as represented by arrow 513. Similarly, the wireless computing system 504 may repeat the same process as described above for the proximate wireless computing system until the wireless communication is sent from the wireless computing system 504 to the remote wireless computing system 505 as represented by arrow 532. Note that in this case, the proximate wireless computing system was able to send the wireless communication to the remote wireless computing system via two different wireless paths.

In the case of FIG. 6, the proximate wireless computing system 602 identifies wireless computing system 603 as being within range. The proximate wireless computing system 602 sends the wireless communication to the wireless computing system 603 as represented by arrow 612. The wireless computing systems 603 may repeat the same process as described above for the proximate wireless computing system until the wireless communication is sent from the wireless computing system 603 to the remote wireless computing system 606 as represented by arrow 613.

Similarly, the proximate wireless computing system 604 identifies wireless computing system 605 as being within range. The proximate wireless computing system 604 sends the wireless communication to the wireless computing system 605 as represented by arrow 632. The wireless computing system 605 may repeat the same process as described above for the proximate wireless computing system until the wireless communication is sent from the wireless computing system 605 to the wireless computing system 607 as represented by arrow 633. The wireless computing system 607 may repeat the same process as described above for the proximate wireless computing system until the wireless communication is sent from the wireless computing system 607 to the remote wireless computing system 606 as represented by arrow 634.

Note that, in this case, the source wireless computing system was able to send the wireless communication to the remote wireless computing system via two different proximate wireless computing systems. As a result, each of one or more proximate wireless computing system may discover one or more wireless paths. Accordingly, the source wireless device may have several wireless paths to choose from when communicating with the remote wireless computing system, or to a computing system communicatively coupled to the remote wireless computing system.

In order to gain full knowledge of the available paths for each proximate wireless computing system, the proximate wireless computing system receives a response to the wireless communication sent to the next wireless computing system in the wireless path (act 216). For instance, in FIG. 3, the response travels the route represented by arrow 312B and 313. In FIG. 4, the response travels the route represented by arrow 414 and 415 (and potentially arrow 413B). In FIG. 5, the proximate wireless computing system 502 receives two responses, one traveling the route represented by arrows 514 and 515, and the other traveling the route represented by arrows 533 and 534. In FIG. 6, the proximate wireless computing system 602 receives a response that traveled the route represented by arrows 614 and 615, while the proximate wireless computing system 604 receives a response that traveled the route represented by arrows 635, 636, and 637.

In each case, the response identifies a path between the next wireless computing system and the remote wireless computing system. The proximate wireless computing system may then identify the wireless path (act 217) as being through the proximate wireless computing system to the next wireless computing system and further along the path identified in the response.

Optionally, the proximate wireless computing system may then transmit an identification of the wireless path to the source (act 218). The source wireless computing system receives the wireless path (act 203) and then potentially uses that wireless path the next time a wireless communication is to be sent to the same destination (act 204). Alternatively, the proximate wireless computing system may optionally not inform the source wireless computing system of the wireless path, but instead just uses the wireless path itself to complete the acts desired by the source wireless computing system. Additionally, if the proximate wireless computing system did not send the full wireless communication during the above-described path discovery process, the proximate wireless computing system may then use the discovered path to forward the full version of the wireless communication with the entire associated payload.

The above-described method allows the source wireless computing system, the proximate wireless computing system, or any other intermediary computing system to discover available wireless paths between that wireless computing system and the remote wireless computing system. Should any of those wireless computing systems receive a subsequent request to communicate with or through the remote wireless computing system, that wireless computing system may use the discovered wireless paths without having to rediscover the wireless paths. This is true regardless of whether the request is received from the original source wireless computing system or from some other wireless computing system.

Figure 7:
FIG. 7 illustrates a data structure that may be used to maintain a memory of available wireless paths that may be used to communicate with one or more other wireless computing systems.

FIG. 7 illustrates a data structure 700 that includes a remote wireless computing system data field 701 that identifies a remote wireless computing system, as well as a possible path data field 702 that identifies possible paths that may be used to communicate with the associated remote wireless computing system. The data structure 700 may be maintained by the source wireless computing system, the proximate wireless computing system or by any other intermediary wireless computing system. The only difference would be that an intermediary wireless computing system may have possible paths associated with a remote wireless computing system that only includes that portion of the path between that intermediary wireless computing system and the remote wireless computing system.

Accordingly, one wireless device may communicate with another despite being out of each other's range. Furthermore, one or more of the intermediary wireless computing systems may be mobile, and may even be a general-purpose wireless device that its user may operate while the intermediary functions described above are performed in the background. This represents a new paradigm shift in the field of wireless networking. This new paradigm presents significant advantages, but also has the challenge that the intermediary wireless devices may be mobile. Accordingly, the discovered wireless paths may change often as wireless computing systems wander in and out of each other's range.

Methods for discovering when a wireless computing system has wandered in and out of range are known to those of ordinary skill in the art. If a source or intermediary wireless device determines that one of the wireless devices used in a wireless path has wandered out of range, the source or intermediary wireless device may drop that wireless path as an option when communicating with a particular remote wireless device. Additionally, the intermediary wireless device may notify any previous intermediary wireless devices or the source wireless device that that wireless route is not longer available. If the notified wireless computing system were also an intermediary, that intermediary may remove the wireless path from its list, and notify other wireless devices until all of the wireless computing systems that relied upon that now unavailable wireless computing system are fully apprised.

Alternatively, the intermediary wireless device could simply wait until all available wireless paths to that remote wireless device are gone before notifying other wireless computing systems. Once all possible paths to a remote wireless device are gone, the source or intermediary wireless computing system could either actively repeat the above-described process to generate a new list of possible paths, or could simply wait until the next time communication with the remote computing system is desired before actively repeating the above-described process. Alternatively, the source or intermediary could repeat the above-described process once the number of possible paths to a remote wireless device drops to a certain threshold.

When multiple wireless paths are available, the source (or intermediary if allowed discretion) wireless computing system may choose which wireless path to use based on performance statistics. Such performance statistics may be gathered during the path discovery process and may include network bandwidth, intermediary device workload, intermediary device security settings, or any other performance statistic. For example, referring to FIG. 7, the data structure 700 may include path information 703 for each of at least some of the possible paths leading to a given destination. The path information 703 might include such performance statistics.

Accordingly, the principles of the present invention allow for two wireless computing systems to communicate even if they are out of each other's range. The communication is facilitated via intermediary computing systems which may themselves be mobile devices. The principles of the present invention also account for the dynamic nature of wireless networks that rely on mobile wireless devices as intermediary nodes. Accordingly, less or no dedicated facilities are needed to complete wireless communication between remote devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a network environment that includes a plurality of wireless computing systems and wherein at least one such system serves as a source wireless computing system from which a wireless communication is to be sent, and one such system serves as a remote wireless computing system intended to receive the wireless communication from the source wireless computing system, and wherein the source and remote wireless computing systems communicate with each other over a wireless path created by one or more intermediary wireless computing systems including a proximate wireless computing system that is most proximate the source wireless computing system in the wireless path, a method for the proximate wireless computing system facilitating wireless communication between the source wireless computing system and the remote wireless computing system by identifying a wireless path for connecting the source and remote wireless computing systems despite the source and remote wireless computing systems being out of range of each other's transmitter/receiver circuitry, the method comprising the following:

a step for creating a first transmission link in a wireless path between the source and remote wireless computing systems, by performing
    an act of receiving at the proximate wireless computing system a wireless communication from the source wireless computing system, the wireless communication specifying either the remote wireless computing system or a computing system that is communicatively coupled to the remote wireless computing system as a destination of the wireless communication; and
    an act of determining at the proximate wireless computing system that the proximate wireless computing system is not the destination of the wireless communication;

a step for creating a next transmission link in the wireless path between the source and remote wireless computing systems, by performing
    an act of identifying at the proximate wireless computing system a next wireless computing system in the wireless path; and
    an act of transmitting the wireless communication to the next wireless computing system in the wireless path; and
    if the next wireless computing system is the intended remote wireless computing system, then performing an act by which the proximate wireless computing system informs the source wireless computing system of each transmission link in the completed wireless path between the source and remote wireless computing systems,
    but if the next wireless computing system is not the intended remote wireless computing system, then continuing to perform a further step for creating a next transmission link in the wireless path until the remote wireless computing system is reached and the wireless path is completed, and thereafter performing an act of informing the source wireless computing system of each transmission link in the completed path.

2. A method in accordance with claim 1, further comprising the following performed by the proximate wireless computing system:
    an act of determining that the next wireless computing system is no longer within range of the proximate wireless computing system; and
    an act of notifying the source wireless computing system that the wireless path is no longer available for communication between the source wireless computing system and the remote wireless computing system.

3. A method in accordance with claim 1, wherein the wireless communication is a first wireless communication and the source wireless computing system is a first source wireless computing system, the method further comprising the following performed by the proximate wireless computing system:
    an act of receiving a second communication from a second source wireless computing system;
    an act of determining that the second communication is destined for the remote wireless computing system; and
    an act of using the path identified for the first source wireless computing system to route the second communication to the next wireless computing system.

4. A method in accordance with claim 3, further comprising the following performed by the proximate wireless computing system:
an act of determining that the wireless path is no longer available for wireless communication to the remote wireless computing system; and
an act of notifying the first source wireless computing system that the wireless path is no longer available for wireless communication between the source wireless computing system and the remote wireless computing system.

5. A method in accordance with claim 1, wherein the wireless communication is a first wireless communication, the method further comprising the following performed by the proximate wireless computing system:
an act of receiving a second wireless communication from the source wireless computing system;
an act of determining that the next wireless computing system is no longer within range of the proximate wireless computing system; and
an act of identifying a new wireless path from the proximate wireless computing system to the remote wireless computing system.

6. A method in accordance with claim 5, further comprising the following performed by the proximate wireless computing system:
an act of notifying the source wireless computing system of the new wireless path.

7. A method in accordance with claim 6, further comprising the following performed by the proximate wireless computing system:
an act of transmitting the second wireless communication to the remote wireless computing system over the new wireless path.

8. A method in accordance with claim 5, further comprising the following performed by the proximate wireless computing system:
an act of transmitting the second wireless communication to the remote wireless computing system over the new wireless path.

9. In a network environment that includes a plurality of wireless computing systems and wherein at least one such system serves as a source wireless computing system from which a wireless communication is to be sent, and one such system serves as a remote wireless computing system intended to receive the wireless communication from the source wireless computing system, and wherein the source and remote wireless computing systems communicate with each other over a wireless path created by one or more intermediary wireless computing systems including a proximate wireless computing system that is most proximate the source wireless computing system in the wireless path, a computer program product for implementing a method for the proximate wireless computing system facilitating wireless communication between the source wireless computing system and the remote wireless computing system by identifying a wireless path for connecting the source and remote systems despite the source and remote wireless computing systems being out of range of each other's transmitter/receiver circuitry, the computer program product comprising one or more computer-readable media for storing computer-executable instructions which implement the method when executed in a computer system, and wherein the method is comprised of:
a step for creating a first transmission link in a wireless path between the source and remote wireless computing systems, by performing,
an act of receiving at the proximate wireless computing system a wireless communication from the source wireless computing system, the wireless communication specifying either the remote wireless computing system or a computing system that is communicatively coupled to the remote wireless computing system as a destination of the wireless communication; and
an act of determining at the proximate wireless computing system that the proximate wireless computing system is not the destination of the wireless communication;
a step for creating a next transmission link in the wireless path between the source and remote wireless computing systems, by performing
an act of identifying at the proximate wireless computing system a next wireless computing system in the wireless path; and
an act of transmitting the wireless communication to the next wireless computing system in the wireless path; and
if the next wireless computing system is the intended remote wireless computing system, then performing an act by which the proximate wireless computing system informs the source wireless computing system of each transmission link in the completed wireless path between the source and remote wireless computing systems,
but if the next wireless computing system is not the intended remote wireless computing system, then continuing to perform a further step for creating a next transmission link in the wireless path until the remote wireless computing system is reached and the wireless path is completed, and thereafter performing an act of informing the source wireless computing system of each transmission link in the completed path.

10. A computer program product in accordance with claim 9, wherein the one or more computer-readable media are physical storage media.

11. A computer program product in accordance with claim 10, wherein the physical storage media is volatile system memory.

12. A computer program product in accordance with claim 10, wherein the physical storage media is non-volatile memory.

13. In a network environment that includes a plurality of wireless computing systems and wherein at least one such system serves as a source wireless computing system from which a wireless communication is to be sent, and one such system serves as a remote wireless computing system intended to receive the wireless communication from the source system, and wherein the source and remote wireless computing systems communicate with each other over a wireless path created by one or more intermediary wireless computing systems including a proximate wireless computing system that is most proximate the source wireless computing system in the wireless path, a method for the source wireless computing system to communicate with the remote wireless computing system by identifying a wireless path for connecting the source and remote systems despite the source and remote wireless computing systems being out of range of each other's transmitter/receiver circuitry, the method performed by the source wireless computing system comprising the following:
an act of identifying at the source wireless computing system a plurality of wireless devices within range of the source wireless computing system, wherein one of the identified plurality of wireless devices is a proximate wireless computing system to which a first link in the wireless path is to be established;

an act of transmitting from the source wireless computing system a first wireless communication to at least the proximate wireless computing system in the wireless path, the first wireless communication specifying the remote wireless computing system or a computing system that is communicatively coupled to the remote wireless computing system as the destination of the wireless communication;

an act of receiving at the source wireless computing system a response to the first wireless communication from the proximate wireless computing system, the response specifying the first link of the wireless path;

an act of identifying at the proximate wireless computing system a next wireless computing system in the wireless path; and an act of transmitting the first wireless communication to the next wireless computing system in the wireless path; and if the next wireless computing system is the intended remote wireless computing system, then performing an act by which the proximate wireless computing system (1) receives a response to the first wireless communication from the remote wireless computing system, the response specifying the next link of the wireless path, and (2) informs the source wireless computing system of each transmission link in the completed wireless path between the source and remote wireless computing systems, so that a second wireless communication can then be transmitted along the wireless path from the source wireless computing system to the remote wireless computing system, but if the next wireless computing system is not the intended remote wireless computing system, then continuing to transmit the first wireless communication to a next wireless computing system so as to identify a next transmission link in the wireless path, and so on, until the remote wireless computing system is reached and each link of the wireless path is completed, and thereafter performing an act of informing the source wireless computing system of each transmission link in the completed path so that the second wireless communication can be transmitted along the wireless path from the source wireless computing system to the remote wireless computing system.

14. A method in accordance with claim 13, wherein the wireless path is a first wireless path, the method further comprising the following:

an act of transmitting the first wireless communication to a first intermediary wireless computing system in a second wireless path that leads to the remote wireless computing system; and an act of receiving a response to the first wireless communication from the first intermediary wireless computing system in the second wireless path.

15. A method in accordance with claim 14, further comprising the following:

an act of identifying that the first wireless path is more efficient than the second wireless path.

16. A method in accordance with claim 15, wherein the act of identifying that the first wireless path is more efficient than the second wireless path comprises the following:

an act of comparing performance statistics received in the response from the proximate wireless computing system in the first wireless path with performance statistics received in the response from the first intermediary wireless computing system in the second wireless path.

17. A method in accordance with claim 15, further comprising the following:

an act of determining that the first wireless path is no longer available for communication with the remote wireless computing system; and after the act of determining that the first wireless path is no longer available, an act of using the second wireless path to communicate with the remote wireless computing system.

18. A computer program product for use in a network environment that includes a plurality of wireless computing systems and wherein at least one such system serves as a source wireless computing system from which a wireless communication is to be sent, and one such system serves as a remote wireless computing system intended to receive the wireless communication from the source wireless computing system, and wherein the source and remote wireless computing systems communicate with each other over a wireless path created by one or more intermediary wireless computing systems including a proximate wireless computing system that is most proximate the source wireless computing system in the wireless path, a computer program product for implementing a method for the source wireless computing system to communicate with the remote wireless computing system by identifying a wireless path for connecting the source and remote systems despite the source and remote wireless computing systems being out of range of each other's transmitter/receiver circuitry, the computer program product comprising one or more computer-readable media for storing computer-executable instructions which, when executed in a computer system, implement the method recited in claim 13.

19. A computer program product in accordance with claim 18, wherein the one or more computer-readable media are physical storage media.

20. A computer program product in accordance with claim 19, wherein the physical storage media is volatile system memory.

21. A computer program product in accordance with claim 19, wherein the physical storage media is non-volatile memory.

22. A computer program product in accordance with claim 18, wherein the one or more computer-readable media further having thereon the following:

computer-executable instructions for causing the first wireless communication to be transmitted to a first intermediary wireless computing system in a second wireless path that leads to the remote wireless computing system; and computer-executable instructions for detecting receipt of a response to the first wireless communication from the first intermediary wireless computing system in the second wireless path.

23. A computer program product in accordance with claim 22, wherein the one or more computer-readable media further having thereon the following:

computer-executable instructions for identifying that the first wireless path is more efficient than the second wireless path.

24. A computer program product in accordance with claim 23, wherein the computer-executable instructions for identifying that the first wireless path is more efficient than the second wireless path comprise the following:

computer-executable instructions for comparing performance statistics received in the response from the first intermediary wireless computing system in the first wireless path with performance statistics received in the response from the first intermediary wireless computing system in the second wireless path when executed by the source wireless computing system.

25. A computer program product in accordance with claim 22, wherein the one or more computer-readable media further have thereon the following:

computer-executable instructions for determining that the first wireless path is no longer available for communication with the remote wireless computing system; and computer-executable instructions for using the second wireless path to communicate with the remote wireless computing system after executing the computer-executable instructions for determining that the first wireless path is no longer available.

\* \* \* \* \*